United States Patent
Hall et al.

(10) Patent No.: US 10,346,702 B2
(45) Date of Patent: Jul. 9, 2019

(54) IMAGE DATA CAPTURE AND CONVERSION

(71) Applicant: Bank of America Corporation, Charlotte, NC (US)

(72) Inventors: John B. Hall, Charlotte, NC (US); Michael J. Pepe, Jr., Wilmington, DE (US); Murali Santhanam, Naperville, IL (US); Kerry Kurt Simpkins, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/658,025

(22) Filed: Jul. 24, 2017

(65) Prior Publication Data

US 2019/0026577 A1   Jan. 24, 2019

(51) Int. Cl.
| | |
|---|---|
| *G06K 9/00* | (2006.01) |
| *G06K 9/03* | (2006.01) |
| *G06K 9/18* | (2006.01) |
| *G06K 9/20* | (2006.01) |
| G06F 16/93 | (2019.01) |
| G06F 16/33 | (2019.01) |

(52) U.S. Cl.
CPC ............ *G06K 9/03* (2013.01); *G06K 9/00442* (2013.01); *G06K 9/186* (2013.01); *G06K 9/2081* (2013.01); *G06F 16/3344* (2019.01); *G06F 16/93* (2019.01)

(58) Field of Classification Search
CPC ........ G06K 9/03; G06K 9/2081; G06K 9/186; G06K 9/00442; G06F 17/30011; G06F 17/30684
See application file for complete search history.

(56) References Cited

U.S. PATENT DOCUMENTS

| | | |
|---|---|---|
| 3,701,099 A | 10/1972 | Hall et al. |
| 3,949,363 A | 4/1976 | Holm |
| 3,979,722 A | 9/1976 | Sakoe et al. |
| 3,988,715 A | 10/1976 | Mullan et al. |
| 4,251,799 A | 2/1981 | Jih et al. |
| 4,274,079 A | 6/1981 | Todd et al. |
| 4,644,410 A | 2/1987 | Schlichtig |

(Continued)

FOREIGN PATENT DOCUMENTS

WO   20010157786 A1   8/2001

*Primary Examiner* — Amara Abdi
(74) *Attorney, Agent, or Firm* — Michael A. Springs; Moore & Van Allen PLLC; Nicholas C. Russell

(57) ABSTRACT

Embodiments of the present invention provide a system for image capture and conversion. The system receives or captures an image of a resource document comprising image coordinates. The system can then cause a user interface of a computing device to display the image of the resource document and request that a specialist provide an input of an image coordinate area associated with a data field of the resource document. The specialist then provides a selection of boundaries for the coordinate area that encloses a value of the data field within the image of the resource document. The system then applies a data field-specific OCR process to the provided image coordinate area to extract a value of the data field. The extracted value can be presented on the display along with an enlarged view of the image coordinate area to allow the specialist to verify the accuracy of the extracted value.

20 Claims, 9 Drawing Sheets

(56) References Cited

U.S. PATENT DOCUMENTS

| | | |
|---|---|---|
| 4,914,709 A | 4/1990 | Rudak |
| 4,932,065 A | 6/1990 | Feldgajer et al. |
| 4,974,260 A | 11/1990 | Rudak |
| 5,091,968 A | 2/1992 | Higgins et al. |
| 5,179,599 A | 1/1993 | Formanek et al. |
| 5,212,739 A | 5/1993 | Johnson et al. |
| 5,272,766 A | 12/1993 | Higgins et al. |
| 5,305,396 A | 4/1994 | Betts et al. |
| 5,367,578 A | 11/1994 | Golem et al. |
| 5,455,875 A | 10/1995 | Chevion et al. |
| 5,544,264 A | 8/1996 | Bellegarda et al. |
| 5,550,931 A | 8/1996 | Bellegarda et al. |
| 5,850,480 A | 12/1998 | Scanlon et al. |
| 5,852,676 A | 12/1998 | Lazar et al. |
| 5,889,896 A | 3/1999 | Meshinsky et al. |
| 5,933,525 A | 8/1999 | Makhoul et al. |
| 5,933,531 A | 8/1999 | Lorie et al. |
| 6,000,612 A | 12/1999 | Xu et al. |
| 6,011,865 A | 1/2000 | Fujisaki et al. |
| 6,047,093 A | 4/2000 | Lopresti et al. |
| 6,269,171 B1 | 7/2001 | Gozzo et al. |
| 6,567,547 B1 | 5/2003 | Roman |
| 6,577,755 B1 | 6/2003 | Lode |
| 7,149,347 B1 | 12/2006 | Wnek |
| 7,421,387 B2 | 9/2008 | Godden |
| 7,499,588 B2 | 3/2009 | Jacobs et al. |
| 7,561,734 B1 | 7/2009 | Wnek |
| 7,590,275 B2 | 9/2009 | Clarke et al. |
| 7,689,613 B2 | 3/2010 | Candelore |
| 7,746,496 B2 | 6/2010 | Henry et al. |
| 7,755,790 B2 | 7/2010 | Henry et al. |
| 7,917,286 B2 | 3/2011 | Taylor et al. |
| 8,023,132 B2 | 9/2011 | Henry et al. |
| 8,176,004 B2 | 5/2012 | Malaney et al. |
| 8,233,751 B2 | 7/2012 | Patel et al. |
| 8,320,708 B2 | 11/2012 | Kurzweil et al. |
| 8,379,914 B2 * | 2/2013 | Nepomniachtchi .. G06Q 20/042 235/379 |
| 8,531,494 B2 | 9/2013 | Kurzweil et al. |
| 8,824,798 B2 | 9/2014 | Kimura et al. |
| 8,873,890 B2 | 10/2014 | Kurzweil et al. |
| 9,058,808 B2 | 6/2015 | Melamed et al. |
| 9,195,889 B2 * | 11/2015 | Klein ................. G06K 9/00469 |
| 9,223,773 B2 | 12/2015 | Isaacson |
| 9,454,696 B2 | 9/2016 | Campanelli et al. |
| 9,471,869 B2 | 10/2016 | Hall et al. |
| 9,659,327 B2 | 5/2017 | Nuggehalli |
| 10,043,070 B2 | 8/2018 | Szostak |
| 2002/0186883 A1 | 12/2002 | Roman |
| 2005/0114381 A1 | 5/2005 | Borthakur et al. |
| 2005/0289182 A1 | 12/2005 | Pandian et al. |
| 2007/0168382 A1 | 7/2007 | Tillberg et al. |
| 2007/0250532 A1 | 10/2007 | Beato et al. |
| 2008/0091713 A1 | 4/2008 | Candelore et al. |
| 2008/0310721 A1 | 12/2008 | Yang et al. |
| 2009/0010538 A1 | 1/2009 | Kim |
| 2009/0092318 A1 | 4/2009 | Berard et al. |
| 2012/0290601 A1 | 11/2012 | Huang |
| 2014/0253590 A1 | 9/2014 | Needham et al. |
| 2016/0012288 A1 | 1/2016 | Goto et al. |
| 2016/0086053 A1 | 3/2016 | Zhu et al. |
| 2016/0125237 A1 | 5/2016 | Ghatage et al. |
| 2016/0247196 A1 | 8/2016 | Gandhi |
| 2017/0046324 A1 * | 2/2017 | Hu ..................... G06F 16/5846 |
| 2017/0091543 A1 | 3/2017 | Guo et al. |

\* cited by examiner

IMAGE DATA CAPTURE AND CONVERSION

BACKGROUND

Identifying and extracting values of data fields from images of documents requires data and resource intensive optical character recognition processes. The processing power and time required to identify and extract important information from images of documents is significantly reduced if the OCR processes are tailored to specific data fields of the image of the documents and applied only to regions of the document images where that data field is located. However, as the volume and variety of documents increases, the complexity of the OCR process systems increases significantly. Additionally, as some resource documents include data fields in positions that are outliers to default or expected coordinate areas on the document image, manual entry of the values of these data fields is time consuming and exposes the processing system to user error.

Therefore, a need exists to dynamically tune the OCR process for identifying and extracting values of data fields from images of resource documents. The embodiments of the invention herein are designed to quickly correct the image coordinate regions for outlier data fields and store these updated coordinate regions so they can be used to automatically process subsequently received images of documents from the same source.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for image data capture and conversion. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving an image of a resource document comprising image coordinates associated with the resource document. The system may then cause a user interface of a computing device to display the image of the resource document. Once the system receives, from the user interface of the computing device, a user input of an expected image coordinate area for the data field, the system can then apply a data field-specific optical character recognition process to the expected image coordinate area for the data field to extract a value of the data field. Finally, the system can transmit the extracted value of the data field to a resource processing system.

In some embodiments, the system is further configured to store the expected image coordinate data for the data field in a database associated with a source of the resource document or a type of the resource document. When the system receives an image of a new resource document, then the system can apply the data field-specific optical character recognition process to the expected image coordinate data for the data field to extract a new value of the data field.

The system may additionally be configured to cause the user interface of the computing device to display the extracted value of the data field and to transmit, to the user interface of the computing device, a request for a confirmation from a user associated with the computing device that the extracted value of the data field is correct. Once the system receives, from the user interface of the computing device, the confirmation from the user that the extracted value of the data field is correct, the system can transmit the extracted value of the data field the resource processing system in response to receiving the confirmation from the user that the extracted value of the data field is correct.

In some embodiments, the system may request the user input of the expected coordinate area for the data field in response to causing the user interface of the computing device to display the image of the resource document.

Furthermore, in some embodiments of the system, the user input of an expected image coordinate area for the data field further comprises image coordinate boundaries associated with the data field.

Additionally, the system may be configured to compare the extracted value of the data field to a database of previously identified values of the data field from a same source of the resource document or a same type of the resource document, and transmit the extracted value of the data field to a resource processing system in response to determining that the extracted value of the data field matches a previously identified value of the previously identified values.

Finally, in some embodiments of the system, the resource document comprises a financial transaction document.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
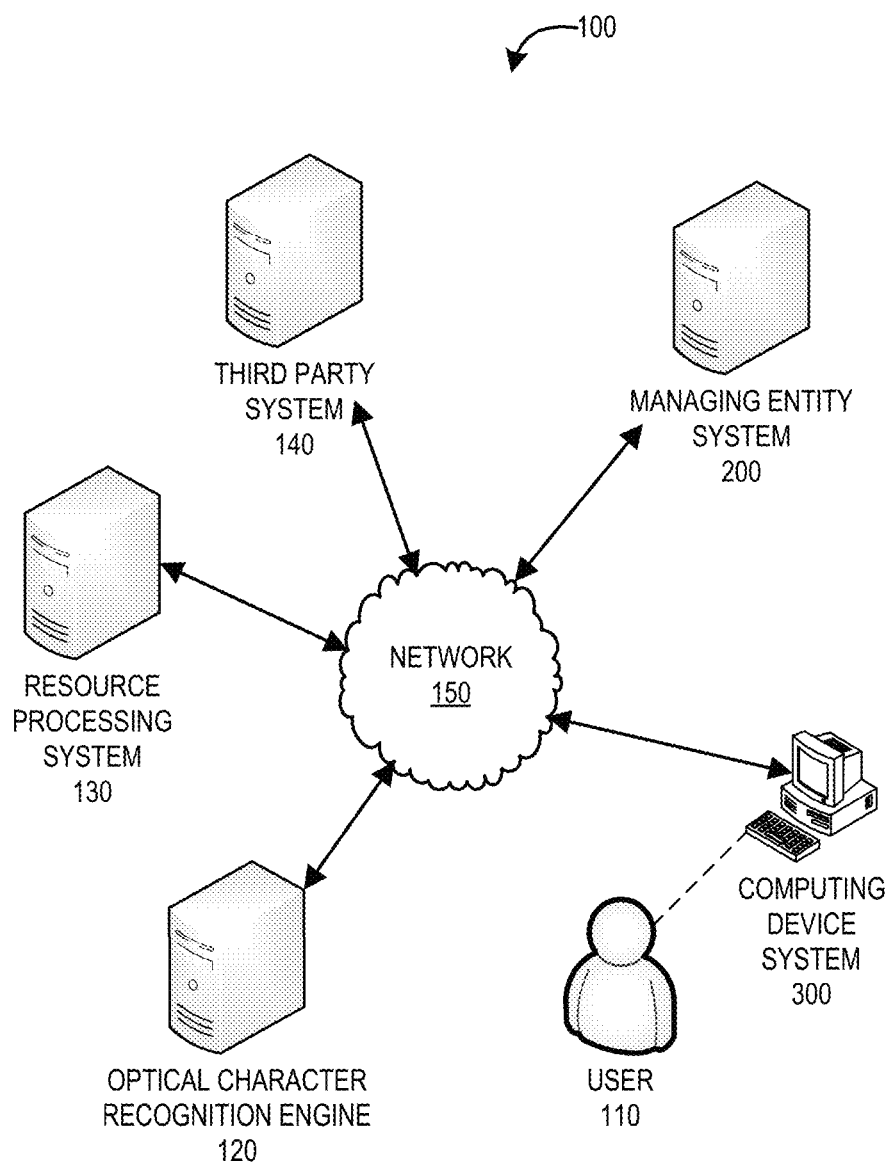
Figure 2:
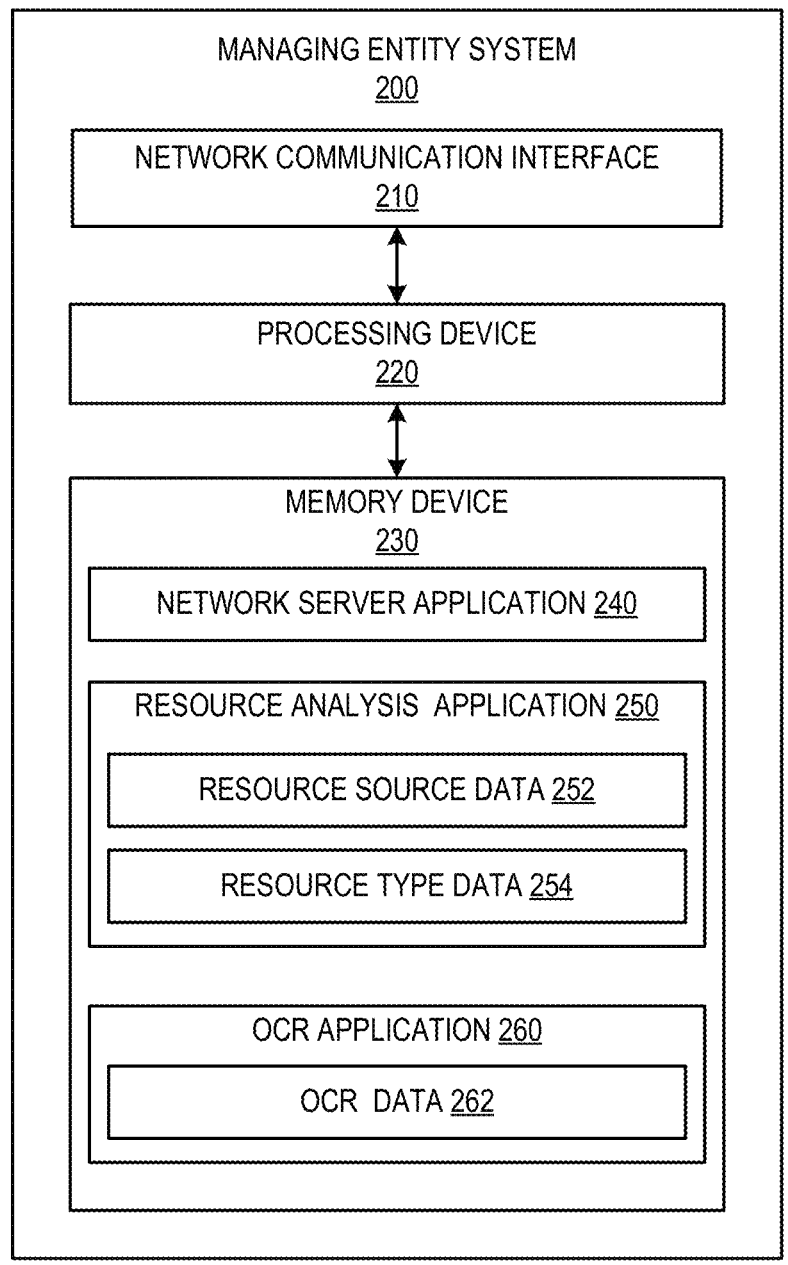
Figure 3:
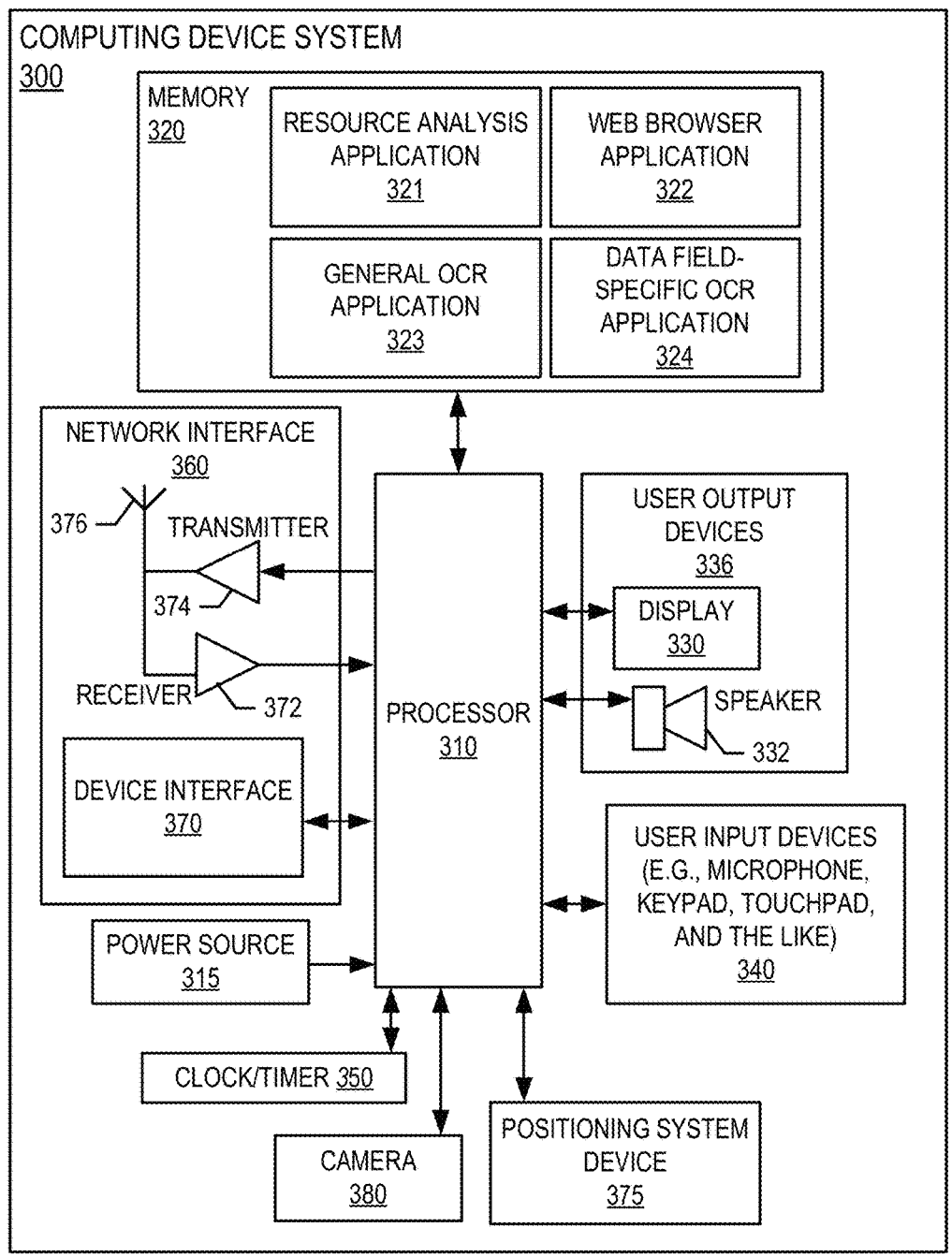
Figure 4:
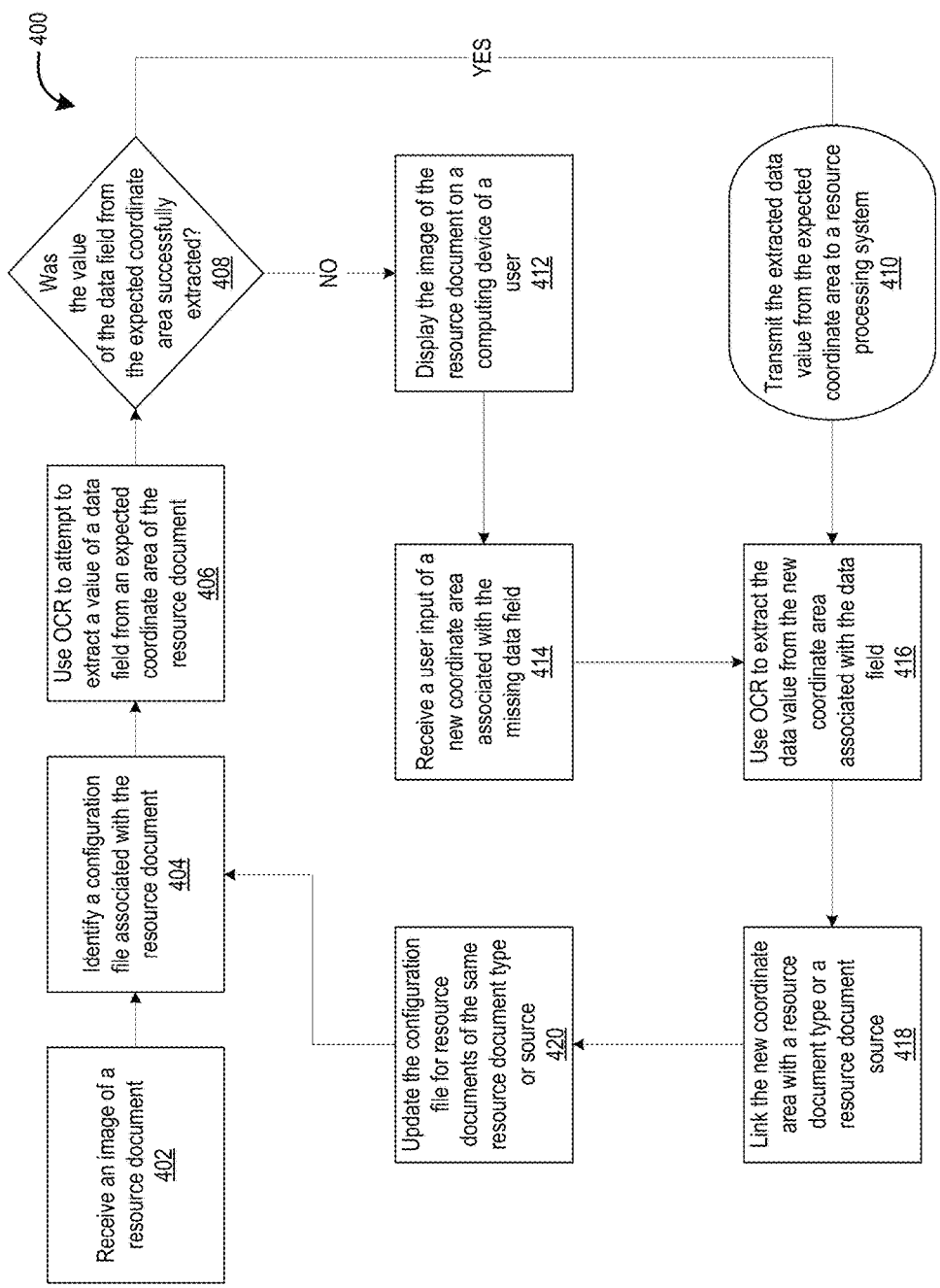
Figure 5:
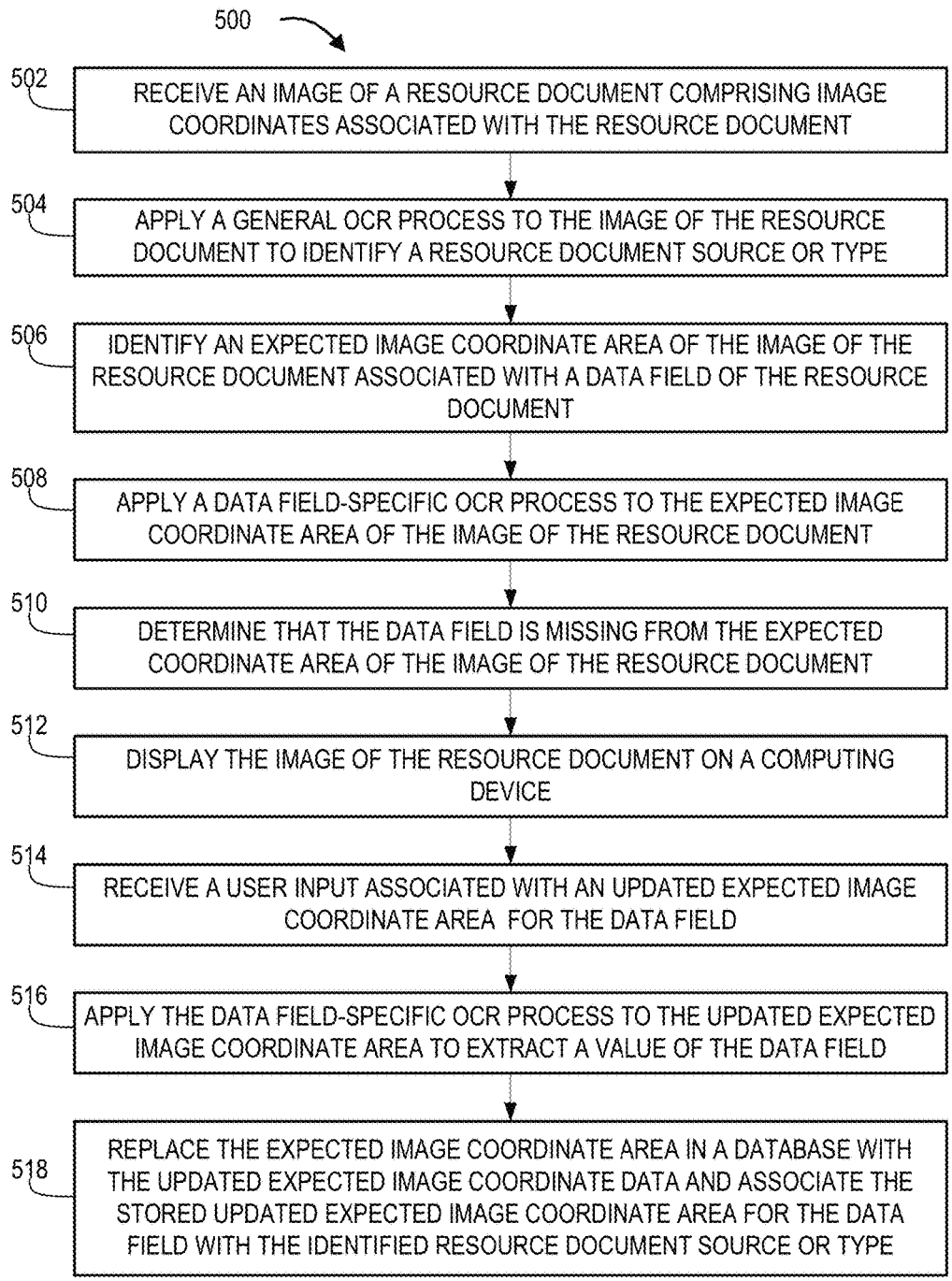
Figure 6:
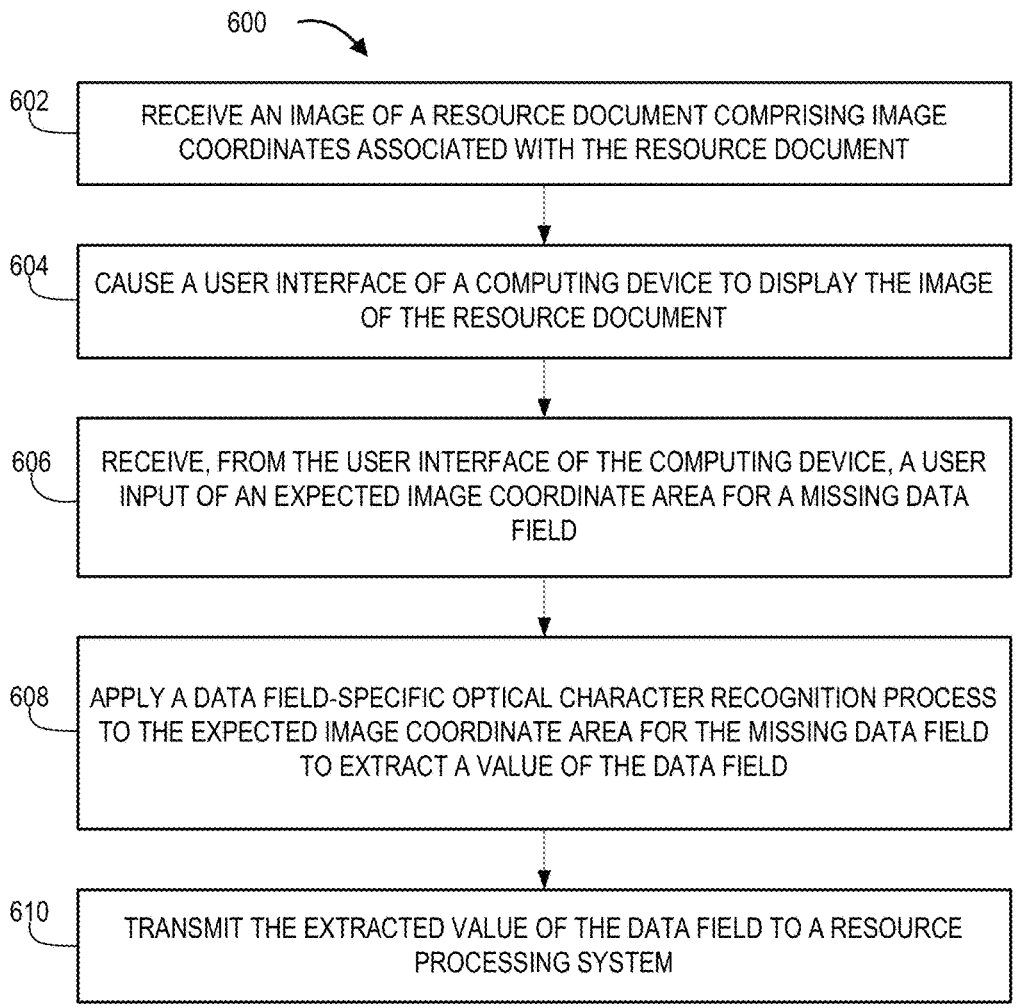
Figure 7A:
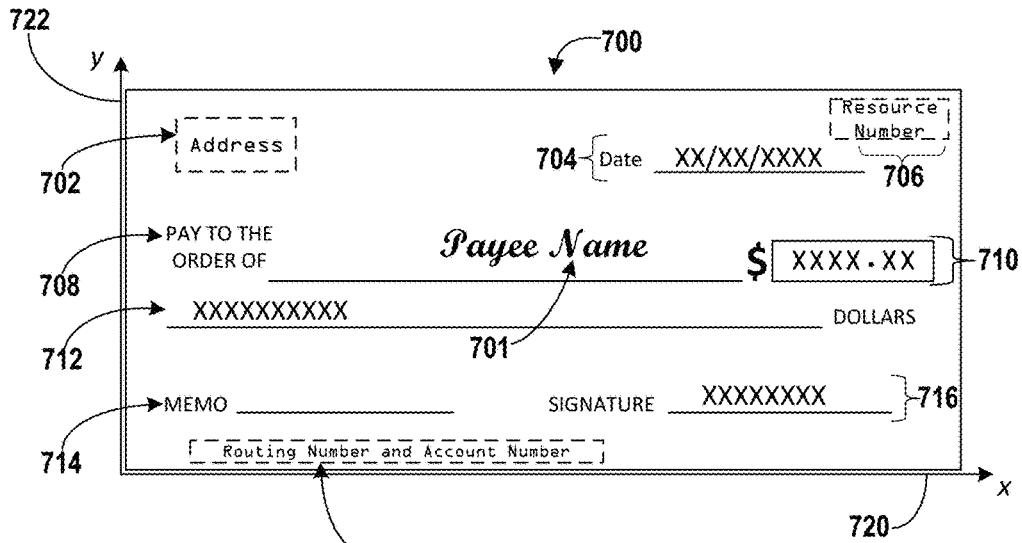
Figure 7B:
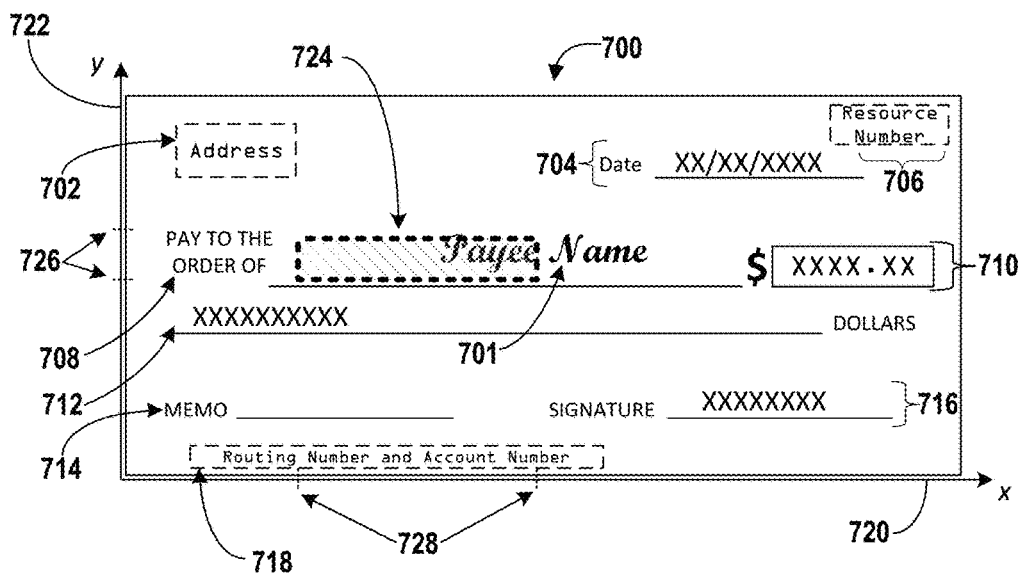
Figure 7C:
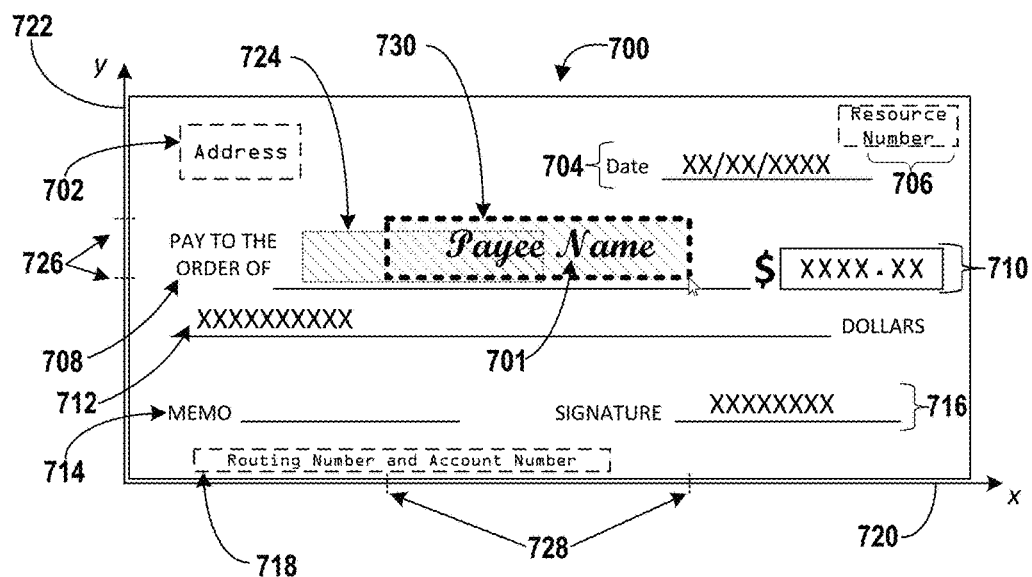
Figure 8:
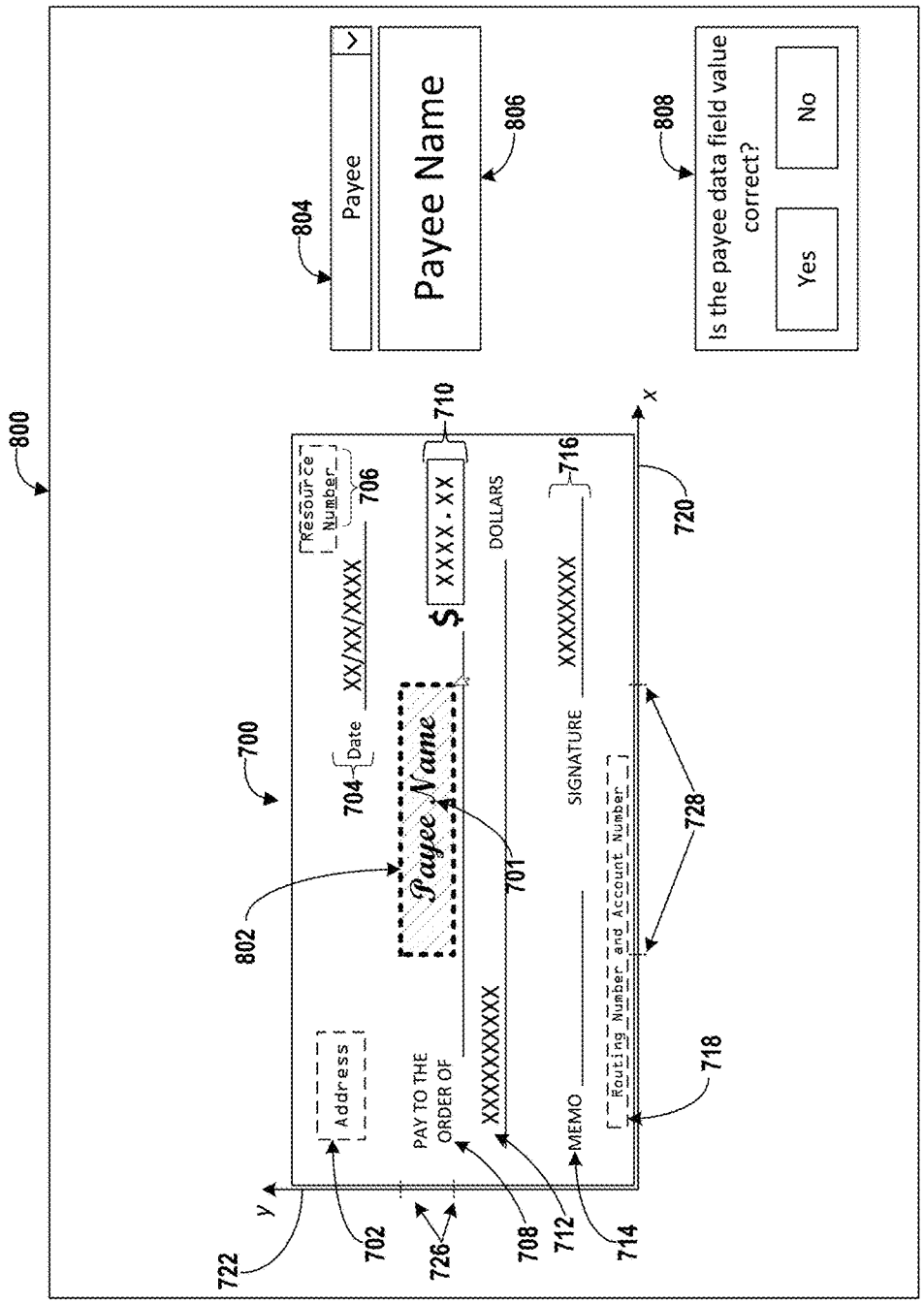

Having thus described embodiments of the invention in general terms, reference will now be made the accompanying drawings, wherein:

FIG. 1 provides a block diagram illustrating a system environment for dynamic optical character recognition capture, tuning, and conversion, in accordance with an embodiment of the invention;

FIG. 2 provides a block diagram illustrating the managing entity system 200 of FIG. 1, in accordance with an embodiment of the invention;

FIG. 3 provides a block diagram illustrating the computing device system 300 of FIG. 1, in accordance with an embodiment of the invention;

FIG. 4 provides a flowchart illustrating a process for dynamically tuning an optical character recognition system, in accordance with an embodiment of the invention;

FIG. 5 provides a flowchart illustrating a process for dynamically tuning an optical character recognition process, in accordance with an embodiment of the invention;

FIG. 6 provides a flowchart illustrating a process for image data capture and conversion, in accordance with embodiments of the invention;

FIG. 7A is a diagram illustrating an image of a resource document, in accordance with embodiments of the invention;

FIG. 7B is a diagram illustrating an image of a resource document with a default expected coordinate area superimposed, in accordance with embodiments of the invention;

FIG. 7C is a diagram illustrating an image of a resource document with a new expected coordinate area superimposed, in accordance with embodiments of the invention; and FIG. 8 is a diagram illustrating a display of a computing device that includes an image of a resource document and additional features for communication with a user, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system for image capture and conversion. The system receives or captures an image of a resource document comprising image coordinates. The system can then cause a user interface of a computing device to display the image of the resource document and request that a specialist provide an input of an image coordinate area associated with a data field of the resource document. The specialist then provides a selection of boundaries for the coordinate area that encloses a value of the data field within the image of the resource document. The system then applies a data field-specific OCR process to the provided image coordinate area to extract a value of the data field. The extracted value can be presented on the display along with an enlarged view of the image coordinate area to allow the specialist to verify the accuracy of the extracted value.

FIG. 1 provides a block diagram illustrating a system environment 100 for processing images of resource documents using dynamic optical character recognition techniques, in accordance with an embodiment of the invention. As illustrated in FIG. 1, the environment 100 includes a managing entity system 200, a computing device system 300, an optical character recognition (OCR) engine 120, a resource processing system 130, and one or more third party systems 140. Each of these systems and the OCR engine 120 may be components of one or more other systems or in network communication with each other via the network 150.

Additionally, a user 110 is associated with the computing device system 300 (e.g., via a user interface of the computing device system 300). As used herein, the term "user" shall generally mean a person or a group of people that are employed by a managing entity (e.g., a financial institution, a document processing entity, and the like) or are otherwise working under or along with the managing entity. In some embodiments, the user 110 is a specialist that has training in identifying data fields of resource documents and providing user input to indicate an image coordinate area associated with the data field.

The managing entity system 200 may comprise one or more other systems, devices, and engines of the system environment 100, or may be in network communication with those other systems, devices, and engines to carry out or otherwise implement one or more of the processes for optical character recognition tuning and conversion described herein. In some embodiments, the managing entity system 200 is owned or controlled by a managing entity. This managing entity may be a financial institution, a document processing institution, a regulatory agency, a logistics or shipping institution, or any other institution that receives paper documents or images of paper documents and needs to electronically extract data fields of those documents. This managing entity system 200 is described in more detail below with respect to FIG. 2.

The computing device system 300 may be any computing device, including hardware and software necessary to receive images of resource documents from the managing entity system 200, the resource processing system 130, and/or one or more of the third party systems 140. Furthermore, the computing device system 300 may be configured to display the image of resource documents to the user 110, as well as to permit communication with the user 110 through one or more components of a user interface. The computing device system 300 may also be configured to transmit data and other information associated with the images of the resource documents, processing templates for these resource documents, OCR instructions, and the like to the managing entity system 200, the OCR engine 120, the resource processing system 130, and/or the third party system 140. In some embodiments, the computing device system 300 is a component of the managing entity system 200 or the resource processing system 130. The computing device system 300 is described in further detail with respect to FIG. 3, below.

The optical character recognition (OCR) engine 120 may be any computing device or set of computing devices configured to scan or read images of documents and identify and extract text, numbers, icons, symbols, security codes, and the like from the documents using an OCR process. In some embodiments, multiple types of OCR processes may be performed by the OCR engine 120. For example, a generic OCR process may be configured to search for, identify, and extract most normal text and numbers in a document. Furthering the example, the OCR engine 120 may comprise one or more specialized OCR processes that are particularly configured to identify and extract values of a certain type from an image. In this way, the OCR engine 120 can tailor an OCR analysis of a document based on information about the type of data that is expected to be present in the image, the data field at issue in the OCR analysis, and the like.

The OCR engine 120 can receive images (e.g., images of resource documents) from the managing entity system 200, the computing device system 300, the resource processing system 130, and/or one or more of the third party system 140. Additionally, the OCR engine 120 can transmit results of an OCR analysis in the forms of extracted values, error messages, requests for additional information, and the like. In some embodiments, the OCR engine 120 is a component of the managing entity system 200, the computing device system 200, the resource processing system 130, and/or the one or more third party systems 140.

The resource processing system 130 may be any system configured to receive resource documents or images of resource documents, analyze and verify the resource documents for information necessary to carry out the functions described in the resource documents, and to verify the authenticity of the agreements. In some embodiments, the resource processing system 130 is owned or otherwise operated by the managing entity (i.e., the entity that owns or otherwise operates the managing entity system 200), while in other embodiments the resource processing system 130 is owned by a processing entity, a financial institution, or some other entity in the business of processing documents and/or images of documents. In some embodiments, the resource processing system 130 is a component of the managing entity system 200.

The resource processing system 130 is configured to receive resource documents (e.g., checks, delivery slips, money orders, certified mail receipts, receipts, and the like) or images of resource documents that need to be processed, recorded, or otherwise executed. The resource processing system 130 may be capable of performing the steps necessary to successfully process most of the received resource documents, but is capable of transmitting the images of the resource documents to the managing entity system 200, the computing device system 300, the OCR engine 120, and/or the third party system 140 with instructions for providing valuable feedback or information that will enable the resource processing system 130 to complete the processing of one or more troublesome resource documents.

In some embodiments, the resource processing system 130 includes a camera, scanner, or other imaging device that is configured to capture an image of a resource document or multiple images of a resource document.

The third party system 140 may be any system owned or operated by some third party that either provides information or can perform certain functions of the processes described herein, as necessary.

As mentioned above, the managing entity system 200, the computing device system 300, the OCR engine 120, the resource processing system 130, and/or the third party system 140 are configured to communicate over the network 150. This network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a resource analysis application 250 which includes resource source data 252 and resource type data 254, an OCR application 260 which includes OCR data 262, and other computer-executable instructions or other data. The computer-executable program code of the network server application 240, the resource analysis application 250, and/or the OCR application 260 may instruct the processing device 220 to perform certain logic, data-processing, and data-storing functions of the managing entity system 200 described herein, as well as communication functions of the managing entity system 200.

In one embodiment, the resource analysis application 250 includes resource source data 252 and resource type data 254. The resource source data 252 may comprise information about financial account numbers of certain resource documents, payor information for certain resource documents, financial institutions associated with certain resource documents, and other information that can be used to associate a received resource document with a known account or account type. The resource type data may include information about types of certain received or known resource documents. These types of resource documents may include, but are not limited to, checks, money orders, shipping labels, envelopes, certified mail receipts, transaction receipts, and the like. The managing entity system 200 and the resource analysis application 250 in particular can reference the resource source data 252 and/or resource type data 254 and associate them with OCR templates that help in extracting data fields from images of the resource documents. For example, the resource analysis application 250 may associate a template of data fields for checks that come from the same account number with that account number in the resource source data 252 and/or associate a template of data fields for a particular type of certified mail receipt with that particular type of certified mail receipt in the resource type data 254.

The data and information stored in the resource analysis application 250 may be updated as templates, resource document types, and resource data sources change or are introduced. In this way, the managing entity system 200 can dynamically maintain an up-to-date database of resource source data 252 and resource type data 254.

In one embodiment, the OCR application 260 includes OCR data 262. This OCR data 262 may include data associated with a general OCR application and/or data field-specific OCR applications. For example, the OCR data 262 may include information about expected types of characters, text, letters, words, images, icons, and the like from a payee name data field in an image of a check.

In some embodiments, the OCR data 262 may also include expected values of extracted data values for particular data fields. For example, the OCR data 262 may include a dictionary of previously identified values or predetermined values of the data field. This dictionary of potential values of a data field can help the OCR application 260 identify and extract the actual value from an image of a resource document and/or determine a level of confidence that the extracted value is an appropriate or correct value of that data field.

The network server application 240, the resource analysis application 250, and/or the OCR application 260 are configured to invoke or use the resource source data 252, the resource type data 254, the OCR data 262, and the like when communicating through the network communication interface 210 with the computing device system 300, the OCR engine 120, the resource processing system 130, and/or the third party system 140.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the computing device system 300, the OCR engine 120, the resource processing system 130, the third party system 140, and the like. The processing device 220 is configured to use the network communication interface 210 to transmit and/or receive data and/or commands to and/or from the other devices connected to the network 150.

Overall, the managing entity system 200 may be configured to control, operate, or provide instructions for the operation of one or more process steps of the inventions described herein. For example, the managing entity system 200 may be configured to cause the resource processing system 130 to transmit an image of a resource document to the computing device system 300, transmit OCR data 262 that includes an OCR template for the transmitted resource document to the computing device system, and provide instructions to the OCR engine 120 to cause the OCR engine 120 to perform analysis processes in response to user input from the computing device system 300. Of course this example is merely for illustrative purposes, but shows one technique for having the managing entity system 200 interact with the rest of the system environment 100 to perform certain function steps of the invention processes described herein.

FIG. 3 provides a block diagram illustrating a computing device system 300 of FIG. 1 in more detail, in accordance with embodiments of the invention. In one embodiment of the invention, the computing device system 300 is a personal computer or industrial computer with one or more desktop or touchscreen displays. However, it should be understood that these types of computing devices are merely illustrative of a few types of computing device system 300 that may benefit from, employ, or otherwise be involved with embodiments of the present invention and, therefore, should not be taken to limit the scope of embodiments of the present invention. Other types of computing device systems 300 may include mobile computing devices, mobile phones, portable digital assistants (PDAs), pagers, televisions, gaming devices, laptop computers, cameras, video recorders, audio/video player, radio, GPS devices, or any combination of the aforementioned.

Some embodiments of the computing device system 300 include a processor 310 communicably coupled to such devices as a memory 320, user output devices 336, user input devices 340, a network interface 360, a power source 315, a clock or other timer 350, a camera 380, and a positioning system device 375. The processor 310, and other processors described herein, generally include circuitry for implementing communication and/or logic functions of the computing device system 300. For example, the processor 310 may include a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of wireless network. In this regard, the computing device system 300 may be configured to operate with one or more air interface standards, communication protocols, modulation types, and access types. By way of illustration, the computing device system 300 may be configured to operate in accordance with any of a number of first, second, third, and/or fourth-generation communication protocols and/or the like. For example, the computing device system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device system 300 may also be configured to operate in accordance with non-cellular communication mechanisms, such as via a wireless local area network (WLAN) or other communication/data networks.

As described above, the computing device system 300 has a user interface that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310.

The user input devices 340, which allow the computing device system 300 to receive data from a user such as the user 110, may include any of a number of devices allowing the computing device system 300 to receive data from the user 110, such as a keypad, keyboard, touch-screen, touchpad, microphone, mouse, joystick, other pointer device, button, soft key, and/or other input device(s). The user interface may also include a camera 380, such as a digital camera.

The computing device system 300 may also include a positioning system device 375 that is configured to be used by a positioning system to determine a location of the computing device system 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate or exact geographical location of the computing device system 300. In other embodiments, the positioning system device 375 includes a proximity sensor or transmitter, such as an RFID tag, that can sense or be sensed by devices known to be located proximate a merchant or other location to determine that the computing device system 300 is located proximate these known devices.

The computing device system 300 further includes a power source 315, such as a battery, for powering various circuits and other devices that are used to operate the computing device system 300. Embodiments of the computing device system 300 may also include a clock or other timer 350 configured to determine and, in some cases, communicate actual or relative time to the processor 310 or one or more other devices.

The computing device system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the computing device system 300 and/or one or more of the process/method steps described herein. For example, the memory 320 may include such applications as a conventional web browser application 322 and/or a resource analysis application 321 (or any other application provided by the managing entity system 200). These applications also typically instructions to a graphical user interface (GUI) on the display 330 that allows the user 110 to interact with the computing device system 300, the managing entity system 200, and/or other devices or systems. In one embodiment of the invention, when the user 110 decides to enroll in a resource analysis application 321 program, the user 110 downloads, is assigned, or otherwise obtains the resource analysis application 321 from the managing entity system 200, or from a distinct application server (e.g., from the resource processing system 130 or a third party system 130). In other embodiments of the invention, the user 110 interacts with the managing entity system 200 or the resource accumulation system 400 via the web browser application 322 in addition to, or instead of, the resource analysis application 321.

The memory 320 may include a general OCR application 323. The general OCR application 323 may comprise a general optical character recognition process that can be performed by the computing device system 300 itself or it may comprise instructions that can be sent to the OCR engine 120 for carrying out a general or default OCR application.

Similarly, the memory 320 may also include one or more data field-specific OCR applications 324. The data field-specific OCR application 324 may comprise one or more optical character recognition processes that can be run on the computing device system and are specially designed to identify and extract characters and values that are expected to be present in a particular data field of a resource document. In other embodiments, the data field-specific OCR application 324 may comprise one or more sets of instructions that can be sent to the OCR engine 120 to cause the OCR engine 120 to perform data field-specific OCR processes on portions of images of resource documents and return extracted values or error messages to the computing device system 300.

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein.

Turning now to FIG. 4, a flowchart illustrating a process 400 for dynamically tuning an optical character recognition process is provided. The process 400 begins with block 402, where an image of a resource document is received. The image of the resource document may include image coordinates (e.g., x and y coordinates) associated with the resource document. Next, a configuration file associated with the resource document is identified, as shown in block 404. The configuration file includes a template for the resource document, including expected coordinate areas or regions of the resource document associated with data fields. Using this configuration file, an OCR process is run on the image of the resource document in an attempt to extract a value of a data field from the expected coordinate area of the resource document, as referenced in block 406.

Next, as shown in block 408, the process 400 determines whether the value of the data field form the expected coordinate area of the resource document was successfully extracted or not. If the data value was successfully extracted, then the process 400 moves to block 410, where the extracted data value from the expected coordinate area is transmitted to a resource processing system. Alternatively, if the data value was not successfully extracted, then the process 400 moves to block 412, where the image of the resource document is displayed on a computing device of the user.

The process 400 may then move to block 414, where a user input of a new coordinate area associated with the missing data field is received. This user input may be a selected snippet of the image of the resource document, as selected or otherwise generated by the user (e.g., a data field specialist). For example, the user may use a mouse of the computing device user interface to click and drag a rectangular selection area (i.e., the new coordinate area) around the actual position of the data field. As shown in block 416, an optical character recognition (OCR) process may be used to extract the data value from the new coordinate area of the data field. In some embodiments, the OCR process used is specific to the particular data field that is being analyzed, and therefore is specialized to extract the information from that data field.

Once the resource data value is extracted, the extracted resource data value is transmitted to the resource processing system, as shown in block 410. Additionally, once the resource data value is extracted and the new coordinate area has been received, the process 400 may continue to block 418 where the new coordinate area is linked with the resource document type or the resource document source. For example, the new coordinate area for the data field may be linked with the originating account of the resource document. The process 400 may then update the configuration file for resource documents of the same type or source, as shown in block 420. In this way, when a new resource document from the same originating account is received, the updated configuration file can be used in conjunction with the OCR process to extract the value of the data field without requiring a new user input.

By improving the configuration file for resource documents from the same source (e.g., account number, payee, and the like), the process 400 decreases the processing time and processing resources required to identify a value of a data field of the resource document.

Referring now to FIG. 5, a flowchart is provided to illustrate one embodiment of a process 500 for dynamically tuning optical character recognition processes, in accordance with embodiments of the invention. In some embodiments, the process 500 may include block 502, where the system receives an image of a resource document comprising image coordinates associated with the resource document. As used herein, the term "resource document" may refer to a physical document associated with a conveyance or transaction of items. Generally, a resource document is a type of document that a party to the transaction or a separate party associated with the financial account(s) of the parties are interested in accurately processing to complete or record the transaction. Examples of resource documents include, but are not limited to, checks, money orders, transaction receipts, certified mail receipts, and the like.

A managing entity (e.g., a financial institution or any entity specializing in processing checks or other resource documents) will analyze or otherwise process financial documents as they are received to identify "data fields" that include, but is not limited to, one or more of a payee, a payor, an amount transacted, a financial account of the payee, a financial account of the payor, a currency type, a date of transaction, a magnetic ink character recognition (MICR) line, and the like. As such, the managing entity may control one or more aspects of the system 500 described herein with respect to FIG. 5, and therefore may be associated with a computing device system that receives the image of the resource document. Of course, the managing entity may also be the entity that receives the hard copy of the paper resource document (e.g., the paper check). In such embodiments, a system controlled by the managing entity may scan the paper resource document to generate an image of the resource document.

In scanning the paper resource document, the scanning device may apply or otherwise associate the image of the resource document with a coordinate field. For example, the scanning device or the managing entity system may apply an x-y coordinate field to the image. This x-y coordinate field may be applied such that the x-axis and the y-axis intersect at some known position relative to the resource document in the image of the resource document. The intersection of the axes may be placed at the bottom-left hand corner of the resource document within the image of the resource document. In other embodiments, the system applies the intersection of the axes to a middle section of the resource document. In some embodiments, the scanned image is transmitted to a separate system that applies the coordinate field to the image.

The image of the resource document may, alternatively, originate outside of the managing entity's system. For example an individual associated with the resource document may capture the image of the resource document using a camera device, a mobile device with a camera, a scanning device, or the like. The individual may be prompted by the managing entity system to capture the image of the resource document. For example, the user may have a managing entity mobile application installed on the user's mobile computing device, the managing entity may transmit a request for the capture of the image of the resource document, and the managing entity may automatically transmit the image of the resource document to a computing device system of the managing entity. The managing entity system can also perform image quality, image content, and other checks on the image of the resource document to make sure the image of the resource document is likely to be processed accurately.

In some embodiments, the process 500 includes block 504, where the system applies a general OCR process to the image of the resource document to identify a source or type of the resource document. This OCR process may be applied to the entire image of the resource document or to a specific area within the image of the resource document known (or expected) to include information or data associated with the source of the resource document and/or the type of the resource document. The source of the resource document and the type of the resource document are important in identifying which template to use in analyzing the other contents of the image of the resource document.

A source of the resource document can be any information associated with the origination location of the resource document, a financial account of the payor of the resource document, the payor of the resource document, a financial institution associated with the financial account of the payor, a type of financial account associated with the payor of the resource document, and the like. A type of the resource document can be any information associated with the document type (e.g., a check, a money order, a certified mail receipt, and the like), a version of the financial document (e.g., a cashier's check versus a personal check, a corporate check versus a personal check, and the like), or any other information that would indicate which type of resource document is being processed such that an appropriate template for processing the image of the resource document can be applied.

In one example, the system may apply a general OCR process to the image of a personal check and, from the OCR process, extract a financial account number of the check. This financial account number indicates a source of the check and may also provide additional information about the type of check that is being processed (e.g., a personal check from an account held at a first financial institution).

Additionally, in some embodiments, the process 500 includes block 506, where the system identifies an expected image coordinate area of the image of the resource document associated with a data field of the resource document. For example, the managing entity system may apply a general or default template to the image of the resource document, where the template includes a coordinate area that is expected to be associated with a specific data field. As used herein, the term "data field" refers to a component of the resource document that needs to be processed to execute or record the transaction, deposit, or documentation of the resource document. For example, in embodiments where the resource document comprises a check, the data field may be a payee name, a payor name, a numerical amount of the check, a written amount of the check, a MICR line, a signature of the payor, an address of the payor, an account number of the check, a routing number of the check, a subject line of the check, a date of the check, and the like.

The managing entity system (or any processing system) may have a default template for resource documents (or at least resource documents of a particular type or source) that includes coordinate areas normally associated with each of the data field types. The managing entity system can then check each of these data fields to determine whether a value of the data field is present and/or can be effectively extracted. For example, if the managing entity system is processing a check, coordinate areas for the MICR line, the date, the payor name, the numerical amount of the check, the written amount of the check, and the payee name may be identified for subsequent processing.

As described in block 508, the system can apply a data field-specific OCR process to the expected image coordinate area of the image of the resource document. Multiple data field-specific OCR processes may be used, each OCR process used for one or more of the coordinate areas associated with data fields of the resource document. In some embodiments, the data field-specific OCR process is only applied when the managing entity system has been unable to extract one or more data fields from the resource document at a previous point in time. For example, a general OCR process is run on the image of the resource document in an attempt to identify each of the data fields. However, the general OCR process may be unable to extract one or more of the documents data fields. In such cases, data field-specific OCR processes can be run on the image coordinate areas for each of the missing data fields.

The data field-specific OCR process is an OCR process that is designed particularly to identify and extract the information associated with that data field. For example, when processing a check, a numerical amount data field-specific OCR process is configured to identify and extract numerical values in a data format common to the numerical amount data field (e.g., XX.XX, X,XXX.XX, and the like). Similarly, the payee data field-specific OCR process may be configured to identify and extract text and/or hand-written names or company names. Some of these data field-specific OCR processes may be more resource-intensive than a general OCR process, so the system applies it to only the expected coordinate area for its associated data field.

The computing device of the system may, in some embodiments, include the software and/or processing power necessary to perform the data field-specific OCR process as noted in block 508. However, in other embodiments, the system may transmit at least the expected coordinate area of the image of the resource document to a remote OCR engine or other system configured and specialized to perform data and processing power-intensive OCR operations. The remote OCR engine or specialized system may then transmit any extracted values back to the managing entity system or return an indication that the searched data field is missing or incomplete.

In some embodiments, the process 500 includes block 510, where the system determines that the data field is missing from the expected coordinate area of the image of the resource document. While the data field-specific OCR processes may be well equipped to identify the values of the data field, other factors may prevent the data field-specific OCR process from finding and extracting the entire value of the data field. For example, the actual location of a data field may be wholly within the expected coordinate area of the data field. This inconsistency may be due to a difference in the actual location of the data field on the resource document versus the default template and/or a variance in where the individual that wrote out the resource document wrote in the value of the data field.

For example, a payor of a check may write the payee name several millimeters above the payee line on the check document. The expected coordinate area for the payee name may not extend high enough on the image of the check to enclose the entire payee name, as written out. Therefore, the payee name OCR process would be unable to identify and extract the entire payee name. In this way, the system can determine that the value of the data field is missing, is incomplete, or does not match an expected value or format.

In some embodiments, the system 500 determines that the data field is missing from the expected image coordinate area of the image of the resource document by determining that the data field (i) is not found in the expected coordinate area or (ii) could not be properly extracted by the data field-specific OCR process.

Once the system determines that the value of a certain data field of the resource document cannot be extracted from the image of the resource document, the system can send the image of the resource document to a specialist that is trained to identify the region of the data field within the resource document and provide feedback as to the location and/or boundaries of the data field in the image of the resource document. Accordingly, in some embodiments, the process 500 includes block 512, where the system displays the image of the resource document on a computing device. This computing device may be associated with the specialist such that the specialist is able to view the image of the resource document on the computing device and provide a user input associated with the location and/or boundaries of the data field.

In some embodiments, the system displays an outlined and/or highlighted area that indicates the expected coordinate area of the data field within the image of the data field. In this way, the system can show the specialist where the value of the data field was attempted to be extracted, which in turn helps the specialist identify any deficiencies in the expected coordinate area that can be corrected.

Additionally or alternatively, the system can cause the computing device of the specialist to display a notification of the type of data field (e.g., payee name, numerical amount, written amount, MICR line, date, and the like) that is missing or could not be extracted from the expected coordinate area of the resource document. This notification can help the specialist know which data field to provide user input for. In some embodiments, the notification of the data field includes or comprises a color-coded indication that can help the specialist identify the data field for which to provide user input in a quick manner. The speed of the specialist in identifying the actual coordinate area of the value of the data field is important, particularly when the specialist is tasked with helping to process hundreds or thousands of resource documents per hour as part of a large scale resource document processing system.

The computing device associated with the specialist can also provide one or more tools for a user input including, but not limited to, a mouse, a keyboard, hotkeys, voice commands, a touchscreen, a touchscreen pen, and the like. Therefore, the system can request that the specialist provide the user input in the form of a rectangular selection area of the image of the resource document using the mouse input, the touchscreen input, a touchscreen and pen input, and the like. Additionally or alternatively, the system can provide hotkeys or shortcut key strokes that allow the specialist to more quickly provide useful feedback. For example, the computing device may include one or more keys that, when pressed by the specialist, expands the expected coordinate area of the data field to include a predetermined increase in area in all directions (e.g., increases the coordinate area dimensions by one millimeter, by five millimeters, by five percent, and the like). Similarly, the computing device may include one or more arrow keys that, when pressed by the specialist, shift the expected coordinate area of the resource document along the x-axis and/or along the y-axis.

Once the specialist has adjusted the selection area for the image of the resource document, the specialist can provide a confirmation or "enter" command to set the new selection area as the specialist's selection input. In other embodiments, particularly when the specialists clicks and drags a selection area, the computing device can automatically transmit the selection to another component of the managing entity system. In this way, the specialist can cut down on the amount of time that it takes to select and enter the inputted coordinate area. Of course, these examples are meant to be non-limiting, as any other technique for selecting a coordinate area of an image can be used by the specialist to provide the selection input.

The process 500 may include block 514, where the system receives a user input associated with an updated expected image coordinate area for the data field. This user input may be the selection input provided by the specialist, via the user interface of the computing device. As described above, this user input received from the user interface of the computing device comprises new image coordinate boundaries. These new image coordinate boundaries are associated with the updated expected image coordinate area for the data field. For example, the specialist may have used a mouse to outline an area of the image of the resource document that the specialist identifies as the value of the data field. The coordinates of this outline can be communicated to the system as the new image coordinate boundaries of the missing data field.

The new image coordinates for the missing data field provided by the user may be used as the actual coordinates of the updated expected image coordinate area for the data field. However, in other embodiments, the new image coordinate boundaries provided by the user may be adjusted by the system 500 to set the updated expected image coordinate area. For example, the system 500 may combine the original expected coordinate area of the data field with the newly provided image coordinates to create one updated expected coordinate area. In another example, the original expected coordinate area and the new image coordinate boundaries may be adjusted, averaged, or otherwise modified to create the updated expected image coordinate area for the data field.

In some embodiments, the updated expected image coordinate area is generated by taking the new image coordinate boundaries provided by the user, and applying a buffer zone around the new image coordinate boundaries, thereby creating a larger updated expected coordinate area that is more likely to cover a future resource data value. In this way, the system 500 is able to record a new coordinate area that covers a portion of the resource document known to include the desired value of the data field while covering an additional portion of the resource document in case the desired value of the data field of a future resource document is placed in a slightly different position of the resource document.

Once the updated expected coordinate area has been received or determined, the process 500 may include block 516, where the system applies the data field-specific OCR process to the updated expected image coordinate area to extract a value of the data field. As the updated expected image coordinate area of the data field has been confirmed by the specialist to cover the entire area around the actual value of the missing data field, the data field-specific OCR process should be able to extract the missing value. Of course, in some embodiments, the actual value of the missing data field may have been entered incorrectly (e.g., not an appropriate number of characters, incorrect format) or have been damaged (e.g., smeared or washed out ink, and the like), such that the data field-specific OCR process cannot identify and extract an appropriate value. In such cases, the system may request the specialist to provide a new or different coordinate area for the missing data field, or return an error message to at least one component of the managing entity system indicating an unsuccessful attempt at processing the resource document.

In embodiments where the data field-specific OCR process has identified and extracted the value of the missing data field, the process 500 may proceed to block 518, where the system replaces the expected image coordinate area in a database with the expected image coordinate data and associates the stored updated expected image coordinate area for the data field with the identified resource document source or type. In this way, the managing entity system can prepare for a future processing of a new resource document of the same document type or document source. For example, the system can assume that there is a high likelihood that a check written from one financial account will have the payee name written in the same location for future checks. Therefore, the system stores the new or updated expected coordinate area of the payee name data field in a database and associates this new coordinate area with the account number of the originally processed check.

Once the updated expected image coordinate area for the data field has been stored in the database and associated with the resource document source or resource document type, the system is ready to receive a new resource document of the same resource document source or resource document type. As mentioned above, the resource document type or resource document type may be a financial account associated with the resource document, an individual associated with the resource document, a company or other entity associated with the resource document, or the like.

Therefore, when a new resource document is received, the system 500 may determine that the new resource document is associated with the same individual and/or financial account. The system 500 may then apply the data field-specific OCR process to the updated expected image coordinate area for the data field within the image of the new resource document to extract a value of the data field for the new resource document. In this way, the system is prepared to process the data field the first time it analyzes the resource document and does not require the intervention of a specialist to provide input regarding the actual location of the data field. Of course, if the updated coordinate area for the data field does not successfully identify and extract the value of the data field, the system can once again send the image of the new resource document to the specialist for processing, thereby repeating blocks 512 through 518.

In some embodiments, the system 500 may additionally transmit the extracted value of the data field to a resource processing system in response to extracting the value of the data field. In this way, the managing entity system can help the resource document be processed without requiring time-intensive manual input of the value of the resource document, and without having to cancel or place the resource document on hold until more information or clarification is received from the payor. This allows the managing entity system to fit in seamlessly with a resource document processing system that receives the initial resource document (or the image of the resource document), tries to process the document, determines that at least one data field cannot be identified, and sends the image of the resource document to the managing entity system. Of course, in some embodiments, the managing entity system comprises part of or the entire resource document processing system and therefore manages the entire process from the initial reception of the resource document until the final processing, payment, and/or recording of the resource document.

Referring now to FIG. 6, a flowchart is provided to illustrate one embodiment of a process 600 for image data capture and conversion, in accordance with embodiments of the invention. The process 600 described herein is useful in identifying a specific coordinate area of an image of a document (e.g., a resource document, a check, a receipt, and the like) where information from the document needs to be identified and extracted with the support of a specialist.

For example, this process 600 allows a specialist to provide a user input of an image area (i.e., a coordinate area) that is associated with a data field that could not be processed under normal optical character recognition processes or is in a location that was not expected by a previously-used automated process. In this way, the specialist can provide coordinate boundaries that surround a written out payee name on a check that is being processed when that payee name is not in a location of the check that was expected by the check processing system. Once these coordinate boundaries, or a "snippet," have been provided by the specialist, the system can run an OCR process that is specialized to identify payee names on just that snipped portion of the check to identify and extract the payee name. Furthermore, the system can present an enlarged image of the snipped region, the data field value extracted by the data field-specific OCR process, a confidence score regarding the extracted value, and the like on a user interface of the specialist's computer as part of this process 600.

In some embodiments, the process 600 may include block 602, where the system receives an image of a resource document comprising image coordinates associated with the resource document. As described above, the term "resource document" may comprise any document that includes text, numbers, writing, icons, and the like that the process 600 is configured to identify as part of a resource processing system. For example, the resource document may be a financial transaction document including, but not limited to, a check, a money order, a receipt, and the like.

The image of the resource document may be received because a data field of the resource document could not be easily identified by a normal resource document processing system. For example, a general check processing system, using a default check template for its OCR processes, may have been unable to identify a payee name, a written amount of the check, the MICR number of the check, or the like, and therefore the general check processing system transmitted the image of the resource document to the managing entity system who runs this process 600. In other embodiments, the process 600 is part of a larger resource document processing system, but is only used when necessary to identify values of missing or incomplete data fields. The term "missing data field" refers to the fact that a previous attempt to identify the data field was unsuccessful, but does not mean that the data field is not present at all in the resource document.

As such, block 602 may be triggered in response to determining that a value of a data field of the resource document is missing. Additional information may be received along with the image for the resource document and the image coordinates of the image of the resource document. For example, an indication that a value of a certain data field is missing, the original coordinate area that the general processing system used to search for the value of the data field, possible or likely values of the missing data field (e.g., based on historical data of resource documents from the same source, based on an original OCR process that was inconclusive but identified one or more possible values, and the like), and the like can be transmitted to an received by the managing entity system along with the data and information from block 602.

In some embodiments, the process 600 includes block 604, where the system causes a user interface of a computing device to display the image of the resource document. As noted with respect to the process 500 of FIG. 5, this computing device may be associated with one or more specialists that are trained to identify coordinate areas of missing data fields of the received resource documents.

The display of the computing device may be a component of a user interface that allows communication of data, information, and commands between the computing device (or the managing entity system acting through the computing device) and the specialist. As such, additional information may be presented along with the image of the resource document including, but not limited to, an indication as to which data field is missing, an area where the data field was expected to be located, one or more possible values for the missing data field, confidence scores for the possible values for the missing data field, and the like.

The user interface of the computing device may allow the specialist to adjust the zoom, scaling, position, contrast, brightness, color correction, color saturation, cropping, rotation, and other image enhancement options that may help the specialist identify the actual coordinate area of the missing data field and/or aid a data field-specific OCR process in identifying and extracting the value of the missing data field.

Furthermore, the user interface of the computing device may allow (or request) the specialist to select a coordinate area of the image of the resource document that the specialist identifies as being related to the value of the missing data field. As mentioned with respect to block 512 of FIG. 5, the user interface of the computing device can include one or more user input tools including, but not limited to, a mouse, a keyboard, hotkeys, voice commands, a touchscreen, a touchscreen pen, and the like. In this way, the system can request that the specialist provide the user input in the form of a rectangular selection area of the image of the resource document using the mouse input, the touchscreen input, a touchscreen and pen input, and the like. Additionally or alternatively, the system can provide hotkeys or shortcut key strokes that allow the specialist to more quickly provide useful feedback. For example, the computing device may include one or more keys that, when pressed by the specialist, expands the expected coordinate area of the data field to include a predetermined increase in area in all directions (e.g., increases the coordinate area dimensions by one millimeter, by five millimeters, by five percent, and the like). Similarly, the computing device may include one or more arrow keys that, when pressed by the specialist, shift the expected coordinate area of the resource document along the x-axis and/or along the y-axis.

Next, in some embodiments, the process 600 includes block 606, where the system receives, from the user interface of the computing device, the user input of an expected image coordinate area for the missing data field. While considered an "expected" image coordinate area for the value of the missing data field, the specialist may actually know that the selected coordinate area of the image of the resource document is in fact the correct image coordinate area for the value of the missing data field for this document. However, we can consider this to be the "expected" image coordinate area for that particular data field in future resource documents that are received from the same financial account, are associated with the same payor, and/or are of the same resource document type.

Of course, in some embodiments, the actual user input may be only a component of what the system ultimately uses as the expected image coordinate area for the missing data field. For example, the system may combine the specialist's selected coordinate area with a coordinate area that was originally or previously used to identify the same data field (e.g., a default coordinate area for that data field, a previous user input from that specialist or a different specialist for the same data field in another resource document, and the like).

Alternatively, the system may merge or blend the previous coordinate area with the specialist's coordinate boundaries of the data field to create the new expected coordinate area of the data field. For example, the system may add a portion of the default expected coordinate area for a MICR line to the specialist's selected coordinate boundaries of the MICR line in the present check document to make sure the new expected coordinate area covers an area large enough to catch most or all values of the data field while being small or narrow enough to keep the processing requirements of data field-specific OCR processes low.

Additionally or alternatively, the system may adjust the specialist's input of new coordinate boundaries for the data field by applying a buffer zone (e.g., several millimeters, several percentage points of the selected area, and the like) to the outside of the input boundaries to generate the new expected coordinate area for the data field. This will ensure that the current value of the data field is analyzed by the data field-specific OCR process while planning ahead for any potential deviation from the current location of the value of that data field.

Of course, in some embodiments, the user input from the specialist is used by the process 600 to define the expected coordinate area of the missing data field but one of these adjusted coordinate areas is saved in a database for future processing of resource documents of the same type or source. This practice is useful in ensuring that the current resource document is properly analyzed for the value of the resource data (because the specialist has already provided boundaries for the area surrounding this value) while setting the system up to accommodate some deviation from the current location or length of the value of the same data field in future resource documents that are processed.

Once the expected image coordinate area has been selected or generated, the processes 600 may move on to block 608, where the system applies a data field-specific OCR process to the expected image coordinate area for the missing data field to extract the value of the data field. As with the process 500 in FIG. 5, this data field-specific OCR process may be a component of the computing device of the specialist, a computing device or server of the managing entity system, and/or a remote OCR engine or specialized OCR system that is configured to execute data and processing power-intensive OCR operations. Again, the system may send only (or at least) the expected coordinate area of the image of the resource document to the data field-specific OCR system so this system will only be required to analyze an image that should mostly contain the value of the data field and not include other aspects or data fields of the resource document. This is a quicker processes and requires less processing power than having a data field-specific OCR process (or a general OCR process) analyze the entire image of the resource document to identify a single value.

In embodiments where the system transmits the expected coordinate area of the image of the resource document to a remote OCR engine, the OCR engine may then transmit the value of the data field that was identified and extracted from the expected coordinate area of the image of the resource document once that determination has been made. Alternatively, the OCR engine can return an error message indicating that the value could not be identified or extracted. If that is the case, the process 600 may revert back to block 604 to have the specialist view the image of the resource document again and to request a new coordinate area associated with the missing data field.

Once the extracted value has been identified, the system 600 may cause the user interface of the computing device to display the extracted value of the data field. The system 600 can then transmit, to the user interface of the computing device, a request for a confirmation form a user associated with the computing device that the extracted value of the data field is correct. In addition to the extracted value, the system may additionally provide an image of the snipped portion of the image of the resource document (i.e., the selected expected coordinate area of the missing data field). This displayed snippet may be enlarged or otherwise altered to aide the specialist in seeing, analyzing, and comparing the image of the selected coordinate area to the value extracted by the OCR engine. The system 600 may also present icons that may be selected by the specialist to indicate acceptance or rejection of the extracted value of the missing data field. An example of this is provided as the notification box 808 in FIG. 8, described in more detail below.

Some embodiments of the system 600 include comparing the extracted value of the data field to a database of previously identified values (e.g., a dictionary of previously identified values) of the data field from a same source or same type as the resource document. The system can also provide confidence scores for the extracted value of the data field based on similarities to the data base of previously identified values of that data field.

Finally, the process 600 includes block 610, where the system transmits the extracted value of the data field to a resource processing system. In this way, the process 600 has enabled the general resource document processing system to proceed with analysis and execution of the resource document without requiring substantial human intervention, computer processing power, time, and financial resources.

As with the system 500 of FIG. 5, the system 600 may then store the expected image coordinate data for the data field in a database associated with a source of the resource document or a type of the resource document. Additionally, the system 600 may receive an image of a new resource document. Finally, the system 600 may then apply the data field-specific optical character recognition process to the expected image coordinate data for the data field to extract a new value of the data field.

For both process 500 of FIG. 5 and process 600 of FIG. 6, once the system has extracted the value of the missing data field and, in some embodiments, confirmed its completeness or correctness, the system may automatically present the image of the resource document on the computing device of the specialist and request a user input of an image coordinate area associated with a different data field that is missing. That new input can be analyzed by its respective data field-specific OCR processes to extract the value of the second missing field. In this way, the system can identify values of multiple missing data fields for a single resource document in a quick and efficient manner.

Turning now to FIGS. 7A-C, an image of a resource document 700 (specifically a financial institution check) is provided. FIG. 7A illustrates the sample image of the check 700 including several data fields of the check. These data fields include an address data field 702, a date data field 704, a resource number data field 706, a payee data field 708, a numerical transaction amount data field 710, a written transaction amount data field 712, a memorandum data field 714, a signature data field 716, and a routing number and account number data field 718 (sometimes a MICR line data field). Of course, this is one embodiment of a resource document resembling a check of a financial institution, and other embodiments with additional and/or fewer data fields is contemplated herein. FIG. 7A also shows a written payee name 701.

The sample image of the check 700 of FIG. 7A also includes a representation of the coordinate field of the image of the check 700 in the form of an x-axis 720 and a y-axis 722 that intersect at the lower left-hand corner of the check in the image of the check 700. As mentioned above, the intersection point could be located at any position within the image of the check 700, so long as the system can identify location data or information about the image of the check 700 by referencing its location with respect to the coordinate field. In this way, the system can map out coordinate locations of the image of the check 700 relative to their positions along the x-axis 720 and the y-axis 722. In some embodiments, the axes 720 and 722 include markings based on physical distances (e.g., millimeters, micrometers, centimeters, and the like), or as a percentage of the length or height of the check (e.g., 5% along the length of the check on the x-axis 720 and 70% along the height of the check on the y-axis 722).

This coordinate field is uniform for checks of the same size, therefore a single template utilizing this coordinate field can be used over time for locating data fields of checks from the same financial account (assuming the checks are the same size).

FIG. 7B illustrates the sample image of the check 700 with an example of an expected image coordinate area 724 for a payee data field 708 superimposed for illustrative purposes. This expected image coordinate area 724 may be based on a uniform or default template of the managing entity system and is located at this position because most checks include the payee name in that region. The expected image coordinate area 724 can be determined on the image of the check 700 by using x-axis 720 coordinate boundaries 726 and y-axis 722 coordinate boundaries 728 from the uniform or default check processing template.

As FIG. 7B illustrates, the expected image coordinate area 724 for the payee data field 708 of the default check processing template does not fully cover the actual written payee name 701. Because the expected image coordinate area 724 for the payee data field 708 does not cover the entire written payee name 701, an OCR processes run on this portion of the image of the check 700 will not identify and extract the correct value of the payee name.

Due to this error, the managing entity system may cause the computing device system of the specialist to display the sample image of the check 700 of FIG. 7A or of 7B, including the expected image coordinate area 724. The computing device system of the specialist may then receive a user input from the specialist indicating a new expected coordinate area 730, as illustrated in FIG. 7C. This new expected coordinate area 730 for the payee data field 708 covers the entire written payee name 701, thereby ensuring (or at least greatly improving) the likelihood of a payee data field 708 specific OCR process identifying and extracting the correct value of the payee name data field 708. As described with respect to the process 500 of FIG. 5 and the process 600 of FIG. 6, this new expected coordinate area 730, along with its x-axis 720 coordinate boundaries 726 and its y-axis 722 coordinate boundaries 728 can be stored in a database and associated with checks from the same payor and/or account number. In this way, the next time a check from this account number is received, the general processing system can automatically use the new expected coordinate area 730 of the payee name data field 708 to search for the value of the payee data field 708, as the system can assume that the payee name will be in approximately the same location in future checks.

FIG. 8 illustrates a display 800 presenting an image of a check 700 and additional features that communicate information about the check to a user (e.g., a specialist). This display 800 may be presented on or as part of a user interface of a computing device system associated with the specialist. In particular, this display 800 illustrates a view of the image of the check 700 after the specialist has entered a selection of a coordinate area 802 of the check that is supposed to be associated with the payee data field 708 of the check. The outlined selection or box may be shown on the image of the check 700 as a reference to the specialist of where the specialist selected.

Additionally, FIG. 8 illustrates a heading bar 804 indicating the data field that is missing or could not otherwise be identified by an original OCR process. In some embodiments, this heading bar 804 is auto-populated by the managing entity system based on which data field values it could not identify. However, in some embodiments, the heading bar 804 is selectable by the specialist or another user through the use of a drop-down menu or other navigation tool to select the data field that the specialist would like to check or select. For example, the specialist may wish to check the template's image coordinate areas for several data fields to make sure they cover an appropriate location and are of an appropriate size to capture most values that would be input for that data field. If the specialist is not satisfied with the template's location, the specialist can select a new coordinate area for that data field that can be automatically replace the original image coordinate area in the template.

Furthermore, once the specialist has selected an image coordinate area like the coordinate area 802 for the payee name data field 708, the display 800 may populate a verification box 806 with the value extracted by the data field-specific OCR engine for that data field. As shown in FIG. 8, a textual representation of the payee name has been populated in the verification box 806 based on an OCR process's extraction of the written payee name 701 from the coordinate area 802 of the payee name data field 708.

By displaying the results of the OCR process to the specialist, the system can perform one more check on whether the value of the data field has been correctly extracted or whether further user input is needed. For example, the display 800 can include a notification box 808 with a query as to whether the extracted value of the data field listed in the verification box 806 is correct, and selectable icons of "Yes" or "No" that the specialist can select to respond to the query. Of course other terms and other configurations of this query and response are contemplated, and this is merely one example of how the system can display a notification requesting confirmation of the extracted value of the data field.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/658,061 | SYSTEM FOR DYNAMIC OPTICAL CHARACTER RECOGNITION TUNING | Concurrently herewith |

The invention claimed is:

1. A system for image data capture and conversion, the system comprising:
a memory device; and
a processing device operatively coupled to the memory device, wherein the processing device is configured to execute computer-readable program code to:
receive an image of a resource document comprising image coordinates associated with the resource document;
determine that a data field is missing from an expected image coordinate area of the image of the resource document;
in response to determining that the data field is missing from the expected image coordinate area of the image of the resource document, cause a user interface of a computing device to display the image of the resource document;
cause the user interface of the computing device to request a user input of a new expected image coordinate area for the missing data field in response to causing the user interface of the computing device to display the image of the resource document;
receive, from the user interface of the computing device, the user input of the new expected image coordinate area for the data field;
apply a data field-specific optical character recognition process to the new expected image coordinate area for the data field to extract a value of the data field;
transmit the extracted value of the data field to a resource processing system associated with a type of the resource document;
replace the expected image coordinate area in a database with the new expected image coordinate area; and
associate the new expected image coordinate area for the data field with a source of the received resource document or a type of the received resource document.

2. The system of claim 1, wherein the processing device is further configured to execute the computer-readable program code to:
receive an image of a new resource document; and
apply the data field-specific optical character recognition process to the new expected image coordinate area for the data field to extract a value of the data field in the new resource document.

3. The system of claim 1, wherein the processing device is further configured to execute the computer-readable program code to:
cause the user interface of the computing device to display the extracted value of the data field;
transmit, to the user interface of the computing device, a request for a user input of a confirmation that the extracted value of the data field is correct; and
receive, from the user interface of the computing device, the user input of the confirmation that the extracted value of the data field is correct;
wherein the extracted value of the data field is transmitted to the resource processing system in response to receiving the user input of the confirmation that the extracted value of the data field is correct.

4. The system of claim 1, wherein the user input of the new expected image coordinate area for the data field further comprises image coordinate boundaries associated with the data field.

5. The system of claim 1, wherein the processing device is further configured to execute the computer-readable program code to:
compare the extracted value of the data field to a database of previously identified values of the data field from a same source of the resource document or a same type of the resource document; and
transmit the extracted value of the data field to the resource processing system in response to determining that the extracted value of the data field matches a previously identified value of the previously identified values.

6. The system of claim 1, wherein the resource document comprises a financial transaction document.

7. A computer program product for image data capture and conversion, the computer program product comprising at least one non-transitory computer readable medium comprising computer readable instructions, the instructions comprising instructions for:
receiving an image of a resource document comprising image coordinates associated with the resource document;
determining that a data field is missing from an expected image coordinate area of the image of the resource document;
in response to determining that the data field is missing from the expected image coordinate area of the image of the resource document, causing a user interface of a computing device to display the image of the resource document;
causing the user interface of the computing device to request a user input of a new expected image coordinate area for the missing data field in response to causing the user interface of the computing device to display the image of the resource document;
receiving, from the user interface of the computing device, the user input of the new expected image coordinate area for the data field;
applying a data field-specific optical character recognition process to the new expected image coordinate area for the data field to extract a value of the data field;

transmitting the extracted value of the data field to a resource processing system associated with a type of the resource document;
replacing the expected image coordinate area in a database with the new expected image coordinate area; and
associate the new expected image coordinate area for the data field with a source of the received resource document or a type of the received resource document.

8. The computer program product of claim 7, wherein the computer readable instructions further comprise instructions for:
receiving an image of a new resource document; and
applying the data field-specific optical character recognition process to the new expected image coordinate area for the data field to extract a value of the data field in the new resource document.

9. The computer program product of claim 7, wherein the computer readable instructions further comprise instructions for:
causing the user interface of the computing device to display the extracted value of the data field;
transmitting, to the user interface of the computing device, a request for a user input of a confirmation that the extracted value of the data field is correct;
receiving, from the user interface of the computing device, the user input of the confirmation that the extracted value of the data field is correct;
wherein the extracted value of the data field is transmitted to the resource processing system in response to receiving the user input of the confirmation that the extracted value of the data field is correct.

10. The computer program product of claim 7, wherein the user input of the new expected image coordinate area for the data field further comprises image coordinate boundaries associated with the data field.

11. The computer program product of claim 7, wherein the computer readable instructions further comprise instructions for:
comparing the extracted value of the data field to a database of previously identified values of the data field from a same source of the resource document or a same type of the resource document; and
transmitting the extracted value of the data field to the resource processing system in response to determining that the extracted value of the data field matches a previously identified value of the previously identified values.

12. The computer program product of claim 7, wherein the resource document comprises a financial transaction document.

13. A computer implemented method for image data capture and conversion, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving an image of a resource document comprising image coordinates associated with the resource document;
determining that a data field is missing from an expected image coordinate area of the image of the resource document;
in response to determining that the data field is missing from the image of the resource document, causing a user interface of a computing device to display the image of the resource document;
causing the user interface of the computing device to request a user input of a new expected image coordinate area for the missing data field in response to causing the user interface of the computing device to display the image of the resource document;
receiving, from the user interface of the computing device, the user input of the new expected image coordinate area for the data field;
applying a data field-specific optical character recognition process to the new expected image coordinate area for the data field to extract a value of the data field;
transmitting the extracted value of the data field to a resource processing system associated with a type of the resource document;
replacing the expected image coordinate area in a database with the new expected image coordinate area; and
associating the new expected image coordinate area for the data field with a source of the received resource document or a type of the received resource document.

14. The computer implemented method of claim 13, further comprising:
receiving an image of a new resource document; and
applying the data field-specific optical character recognition process to the new expected image coordinate area for the data field to extract a value of the data field in the new resource document.

15. The computer implemented method of claim 13, further comprising:
causing the user interface of the computing device to display the extracted value of the data field;
transmitting, to the user interface of the computing device, a request for a user input of a confirmation that the extracted value of the data field is correct;
receiving, from the user interface of the computing device, the user input of the confirmation that the extracted value of the data field is correct;
wherein the extracted value of the data field is transmitted to the resource processing system in response to receiving the user input of the confirmation that the extracted value of the data field is correct.

16. The computer implemented method of claim 13, wherein the user input of the expected image coordinate area for the data field further comprises image coordinate boundaries associated with the data field.

17. The computer implemented method of claim 13, further comprising:
comparing the extracted value of the data field to a database of previously identified values of the data field from a same source of the resource document or a same type of the resource document; and
transmitting the extracted value of the data field to the resource processing system in response to determining that the extracted value of the data field matches a previously identified value of the previously identified values.

18. The computer implemented method of claim 13, wherein the resource document comprises a financial document.

19. The computer implemented method of claim 13, wherein the data field comprises an address data field, a date data field, a resource number data field, a payee data field, a numerical amount data field, a written transaction amount data field, a memorandum data field, a signature data field, a routing number data field, or an account number data field.

20. The system of claim 1, wherein the data field comprises an address data field, a date data field, a resource number data field, a payee data field, a numerical amount data field, a written transaction amount data field, a memorandum data field, a signature data field, a routing number data field, or an account number data field.

* * * * *